United States Patent [19]
Fundneider

[11] Patent Number: 4,592,047
[45] Date of Patent: May 27, 1986

[54] CIRCUIT FOR THE SUBSCRIBER TERMINATION IN AN INTEGRATED SERVICES DIGITAL NETWORK

[75] Inventor: Oswald Fundneider, Puchheim, Fed. Rep. of Germany

[73] Assignee: Siemens Aktiengesellschaft, Berlin & Munich, Fed. Rep. of Germany

[21] Appl. No.: 607,625

[22] Filed: May 7, 1984

[30] Foreign Application Priority Data

May 5, 1983 [DE] Fed. Rep. of Germany ....... 3316470

[51] Int. Cl.$^4$ .......................... H04Q 11/04; H04J 3/12
[52] U.S. Cl. ........................................ 370/58; 370/67; 370/110.1
[58] Field of Search .................. 370/58, 60, 65, 66, 370/67, 110.1, 111; 179/84 SS, 84 VE, 41 A, 18 ES, 18 J

[56] References Cited

U.S. PATENT DOCUMENTS

| | | | |
|---|---|---|---|
| 3,542,957 | 11/1970 | Mitchell et al. | 370/111 |
| 3,708,625 | 1/1973 | Angeleri et al. | 370/111 |
| 3,729,590 | 4/1973 | Widl et al. | 370/110.1 |
| 4,466,095 | 8/1984 | Kawano et al. | 370/58 |
| 4,486,878 | 12/1984 | Haversman | 370/60 |

FOREIGN PATENT DOCUMENTS 8304115  5/1983  Int'l Pat. Institute .

OTHER PUBLICATIONS

E. Blum et al., "The Design and Applications of PCM Signalling Multiplexers", Budavox Telecomm. Rev., No. 3, 1979, pp. 1-16.

R. Trachsel, "64 kbit/s Data Adaption Unit for 2048 kbit/s PCM Terminals (DAU)", Hasler Rev., vol. 12, No. 3/4, 1979, pp. 82-91.

ISDN Customer to Network Signalling D Channel Protocol Level 1 Aspects-Moore, Whall, Kerswell--London, England, pp. 750-756, "IEEE Global Telecommunications Conference".

Proceedings of the 1982 International Symposium on Subscriber Loops and Services-Sep. 20-24, 1982, Toronto, Canada, pp. 66-70.

Primary Examiner—Douglas W. Olms
Assistant Examiner—Wellington Chin
Attorney, Agent, or Firm—Hill, Van Santen, Steadman & Simpson

[57] ABSTRACT

A circuit for the subscriber termination in an integrated services digital network (ISDN) to which a number of individual terminals are connected by means of S-interfaces, or by S-interface busses respectively connected in a number of terminals into a common ISDN network termination, each subscriber line having a B+B+D channel structure, has a circuit for interconnecting the D-channels of each of the subscriber line into a common D-channel connected to the common network termination, and means for connecting the common D-channel to each of said subscriber lines as a D-echo channel. The B-channels of each of the subscriber lines are connected in common to the B-channel leading to the common network termination, and the common D-channel from the network termination is connected in common as outputs to each of the subscriber lines.

3 Claims, 1 Drawing Figure

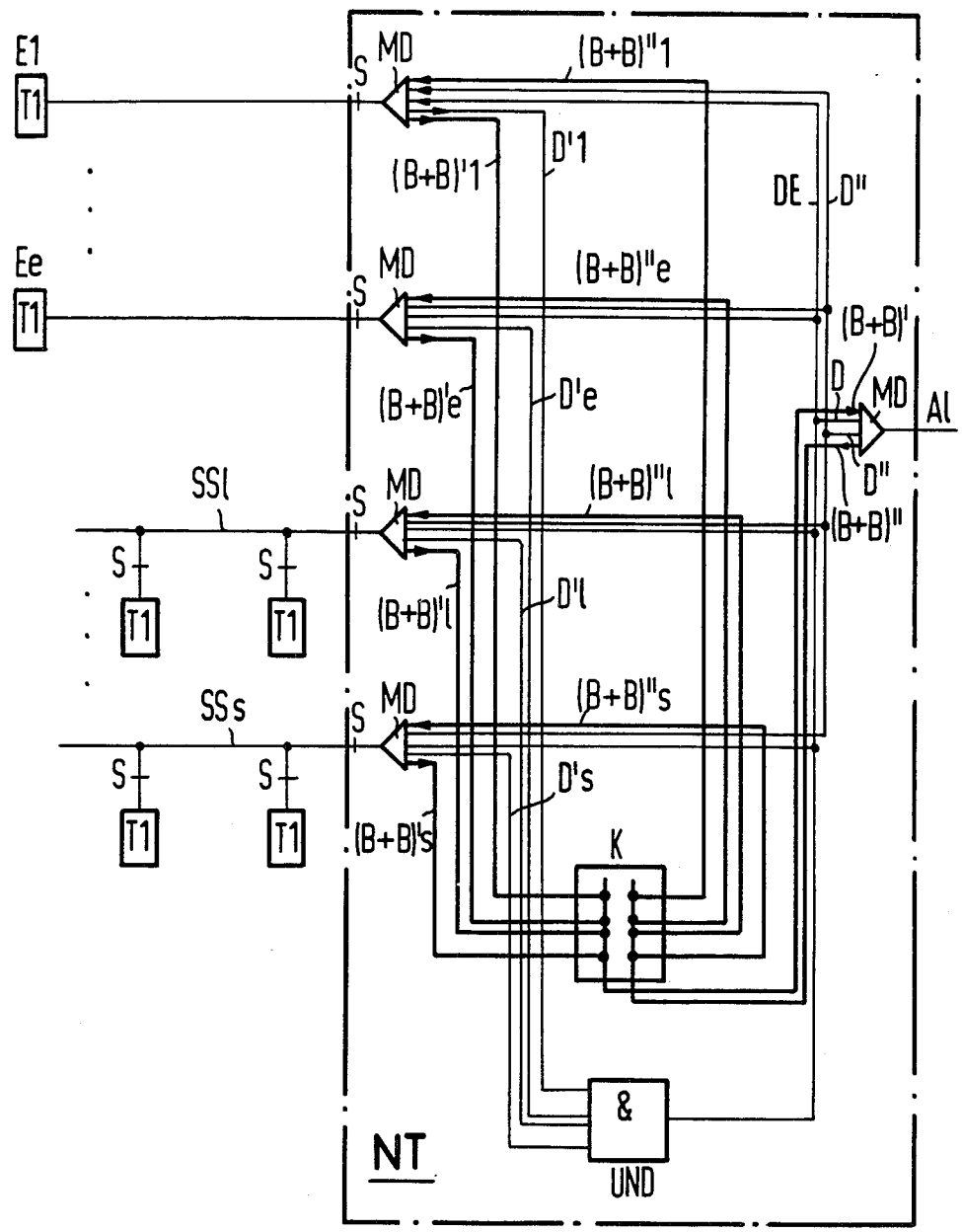

CIRCUIT FOR THE SUBSCRIBER TERMINATION IN AN INTEGRATED SERVICES DIGITAL NETWORK

BACKGROUND OF THE INVENTION

The present invention is directed to a circuit for the subscriber termination in an integrated services digital network (ISDN) in which text, pictures and data are communicated (transmitted and switched) in addition to speech in common telecommunication channels having, for example, a bit rate of 64 kbit/s per transmission direction. Subscribers are enabled for use of the various telecommunications services by means of a common subscriber termination to which terminal equipment for telephony, text communication, picture communication and data communication can be connected in a variety of configurations. The ISDN subscriber termination must exhibit basic properties suitable for this purpose, particularly with respect to the bit rate, the signaling possibilities, and the range.

A so-called basic access having a channel structure designated B+B+D (per transmission direction) has evolved in this context in the international discussion and standardization of this field at the CEPT and the CCITT, wherein B designates a 64 kbit/s channel which can transmit digitally encoded information of different types such as voice, text, facsimile, and data simultaneously, alternatively from connection to connection, or within one connection or in fixed allocation, and wherein D is a 16 kbit/s channel in which signaling characters (with priority) and telemetry signals and slow packet oriented data can be transmitted in multiplex.

The subscriber termination has an ISDN line interface, the so-called U-interface at the end of the subscriber line and an ISDN terminal interface, the so-called subscriber or S-interface, which is connected to the U-interface through a so-called network termination for functions within the level 1 and, under given conditions, within levels 2 and 3 of the ISO function level model. It is assumed that the S-interface has multi-point capability, that is, multiple device configurations can be formulated by means of branching at the S-interface, a plurality of ISDN terminals with S-interface being arranged therein in a bus, star or ring structure as described, for example, in "ZPF" 1982, volume 9, pages 24–31; Fernmeldetechnik 22 (1982) 2, pages 67–79; Fernmeldetechnik 23 (1983) 1, pages 6–9 and 9–14.

In an S-interface bus configuration, all connected terminals can access the D-channel (signaling channel) independently of one another, an allocation of a B-channel being effected thereover by the exchange equipment. Non-interfering access to the S-bus is controlled by the connected terminal in the D-channel itself. All bits proceeding from the terminals through the D-channel to the line termination which are to be forwarded from the line termination to the switching center are subjected to an AND operation for all simultaneously appearing bits and are thereafter fed back to the terminals through the S-interface in a separate D-echo channel in such a manner that 0 bits dominate over 1 bits, that is, when different terminals simultaneously transmit 0 bits and 1 bits in the D-channel, a 0 bit is always returned in the D-echo channel, so that a terminal which has transmitted a 1 bit perceives this deviation and discontinues its accessing attempt.

In the bus configuration, the S-interface enables connection of up to eight terminals given a bus length of about 150 meters, the range being about 1 kilometer in an individual device configuration having only one terminal or in a star configuration wherein each terminal is connected to a network termination through a separate line.

When a number of individual terminals are to be connected to a common ISDN network termination through separate S-interfaces, a problem is the manner by which the individual interface-associated D-channels in the network termination unit are to be united with the common D-channel proceeding to the switching control. It is an object of the present invention to provide a circuit for solving this problem.

The above objects are inventively achieved in a circuit for a subscriber termination in an integrated services digital network wherein monofunctional or multifunctional terminals comprising an S-interface (which may be obtained under given conditions through a matching unit) are connected through a network termination to the subscriber line which forms an ISDN basic access. The B-channels proceed through the subscriber line between the ISDN network termination and a switching center and are respectively allocated to a terminal controlled by the switching center together with the D-channel combined therewith in multiplex, or fanned from multiplex in the network termination. The individual terminal-associated or bus-associated D-channels in the transmission direction toward the switching control are conducted through an AND gate to the common D-channel, which continues to the switching center. The output of the AND gate is also connected through a common D-echo channel to the individual terminal-associated or bus-associated D-echo channels of the opposite transmission direction.

The circuit disclosed and claimed herein as described above, which makes use of level 1 access protocol for accessing an S-bus in modified form for combining the D-channels of a number of S-interfaces individually conducted to the network termination unit with the common D-channel, and which can be employed both for S-terminations of the same subscriber as well as to S-termination of different subscribers, offers the advantage of an uncomplicated realization of individual connection of a number of individual terminals to the common ISDN network termination unit by the terminal's own ISDN S-interface. Additionally the circuit provides greater flexibility in the configuration of ISDN multi-device terminations because the circuit permits connections of ISDN S-interface busses respectively combining a number of terminals in a common ISDN network termination.

DESCRIPTION OF THE DRAWINGS

FIG. 1 is a schematic block diagram of a circuit for the subscriber termination in an integrated services digital network constructed in accordance with the principles of the present invention.

DESCRIPTION OF THE PREFERRED EMBODIMENTS

An ISDN network termination NT is shown in FIG. 1 having a plurality of S-interfaces designated S. Terminals E1 . . . Ee are respectively individually connected to the ISDN S-interfaces S of the network termination NT. In addition, ISDN S-interface busses SS1 . . . SSs which each combine a plurality of terminals are connected to the network termination NT. The designation T1 for each of the individual terminals in FIG. 1 indicates that those terminals realize the so-called ISDN-T1 functions and thus meet the ISDN S-interface conditions. It is possible, however, that the actual terminal may include functions which do not meet these conditions, in which case a known adapter means which assures functional access to the ISDN must be allocated to the terminal. The S-interfaces of the ISDN network termination NT thus respectively form an ISDN basic access having the channel structure B+B+D per transmission direction, with the individual channels being time-multiplexed separately in respect of each transmission direction. The network termination NT is connected to a switching center (not shown in the FIGURE) through a subscriber line Al.

In the drawing and the accompanying description, the convention of a single prime for designating incoming signals (that is, signals transmitted in the direction toward the switching control unit VS) and a double prime to designate outgoing signals (that is, signals transmitted in the opposite direction away from the switching control unit VS) will be employed. As shown in FIG. 1, the channels (B+B)'1 ... (B+B)'e for the individual terminal-associated B channels in the incoming direction, the channels (B+B)"1 ... (B+B)"e for the individual terminal-associated B channels in the outgoing direction, the channels (B+B)'1 ... (B+B)'s for the bus-associated B-channels in the incoming direction and the channels (B+B)"1 ... (B+B)"s for the bus-associated B-channels in the outgoing direction are connected to respective inputs and outputs of multiplexer/demultiplexer units MD. These channels are also each connected to respective inputs and outputs of a multiple circuit K.

A subscriber line Al is connected to another multiplexer/demultiplexer means MD to which another B-channel (B+B)' is supplied and from which B-channel (B+B)" is fanned. The signals on the subscriber line Al are transmitted in multiplex with a common D-channel D'al or D"al.

The D-channels D'1 ... D'e associated with individual terminals and the D-channels D'1 ... D's associated with the bus terminals of the incoming transmission direction are connected through an AND gate A to a common D-channel D', which continues to the switching center (not shown in the FIGURE). In the opposite transmission direction, a common D-channel D" is directly connected to the S-interface associated D-channels via the multiplexer/demultiplexer means MD. In this outgoing transmission direction, the output of the AND gate A is connected by means of a common D-echo channel DE to the individual terminal or bus-associated S-interfaces; the combining of the D-echo channel and the D-channel for each interface being undertaken in the multiplexer/demultiplexer means MD associated with a particular S-interface.

The bits received in the individual D-channels via the individual S-terminals of the network termination NT are thus respectively linked or combined by means of an AND function and the result of the AND operation proceeds back in the D-echo channel to all S-interfaces of the termination network NT, and thus to the terminals connected thereto. By exploiting the level 1 access protocol functions of the terminals, a non-interfering or "collision-free" access of the terminals individually connected to an S-interface of the network termination NT, or connected thereto via an S-bus, is controlled by the common D-channel D'. Before transmission is begun, the terminals each check whether the common D-channel is free. This is determined by the reception of a prescribed minimum number of successive 1 bits in the D-echo channel. A 0 bit is always returned in the D-echo channel DE as soon as, given simultaneous accessing attempts by a plurality of terminals, these terminals transmit mutually deviating 0 bits and 1 bits in the individual D-channels D'1 ... D'e and D'1 ... D's, so that a terminal which has emitted a 1 bit is capable of perceiving this deviation and of discontinuing its accessing attempt in response thereto. The free status of the common D-channel D' is thus characterized by a so-called "1 status," with a first 0 bit terminating this status, and 0 bits prevailing over 1 bits in the AND gate A. As is known to those skilled in this technology, according to the standard ISO 3309, every message begins with a flag 01111110 which is then followed by two addresses. Given simultaneous accessing attempts by two terminals, for example, the terminal which had transmitted a first one bit in such address will discontinue its accessing attempt given the first deviating address bit.

The above-described circuit enabling concentration of S-terminations of any desired type may be utilized for subscribers of a private branch exchange, as well as for subscribers connected to a public telecommunications network.

Although other modifications and changes may be suggested by those skilled in the art it is the intention of the inventor to embody within the patent warranted hereon all changes and modifications as reasonably and properly come within the scope of his contribution to the art.

What is claimed is:

1. A circuit for an integrated services digital network having a network termination connected through respective S-interfaces to a plurality of terminal lines, each terminal line having a B+B+D channel structure for each transmission direction, and said terminal lines each having one or more subscriber terminals connected thereto, and means for combining and fanning said B and D channels, said network termination being connected to a switching center via a subscriber line, said circuit comprising:

AND gate means having a plurality of inputs each connected to the D-channel of individual ones of said terminal lines, means for connecting the output of said AND gate means to said switching center, means for connecting the output of said AND gate means to each of said terminal lines over a D-echo channel, and circuit means for connecting the B-channels of each of said terminal lines to the B-channel of said switching center.

2. Apparatus according to claim 1 including means for connecting the common D-channel from said switching center to each of said terminal lines.

3. Apparatus according to claim 1 including multiplexer means connected to said B and D channels for multiplexing said B and D channels together.

* * * * *